May 23, 1933.   Z. STARKS   1,910,646

CONTAINER

Filed April 5, 1932   2 Sheets-Sheet 1

INVENTOR.
Zeston Starks

BY Lancaster, Allwine & Rommel
ATTORNEYS.

May 23, 1933. Z. STARKS 1,910,646
CONTAINER
Filed April 5, 1932 2 Sheets-Sheet 2

INVENTOR.
Zeston Starks
BY Lancaster, Allwine & Rommel
ATTORNEYS.

Patented May 23, 1933

1,910,646

UNITED STATES PATENT OFFICE

ZESTON STARKS, OF MALVERN, OHIO

CONTAINER

Application filed April 5, 1932. Serial No. 603,384.

This invention relates to fluid containers and more particularly to a fluid container embodying features preventing the theft of its contents or the theft of the vehicle of which it may form a part.

Unauthorized persons have been known to remove fuel, such as gasoline, from the tanks of motor vehicles by siphoning or pumping the fuel thru the tanks' filler inlet or draining off the fuel thru the tanks' drainage outlet. In addition, in many cases, they have been known to have stolen the motor vehicle itself.

The primary object of this invention is to provide novel means both for preventing the unauthorized removal of fluid from a container, such as gasoline from the fuel tank of a motor vehicle, as well as to shut off the flow of fuel from the tank to the engine.

Another object is to provide a fluid container, such as a gasoline tank, having a tamper-proof drainage closure.

Still another object is to provide a fluid container, such as brought out above, having means for the proper person to effectively and completely drain the container, if necessary, or to drain off only so much of the contents of the container as may be necessary to carry off sediment, etc., thus preventing the waste of fuel.

Still another object is to provide a novel means whereby a motor vehicle thief will be able to drive off only a very limited distance in the stolen vehicle before the flow of the fuel to the engine will cease and the vehicle stall.

Another object of the invention is to produce a fuel tank provided with means having the dual function of retaining the filler cap in place as well as effectively retaining open or closed the fuel outlet opening or openings from the tank.

Another object is to provide a gasoline tank which will effectively filter the gasoline, yet will not interfere with filling of the tank nor the drainage or feed therefrom.

Other objects and advantages of this invention will be apparent during the course of the following detailed description, taken in connection with the accompanying drawings forming a part of this specification and in which drawings:—

Figure 1:
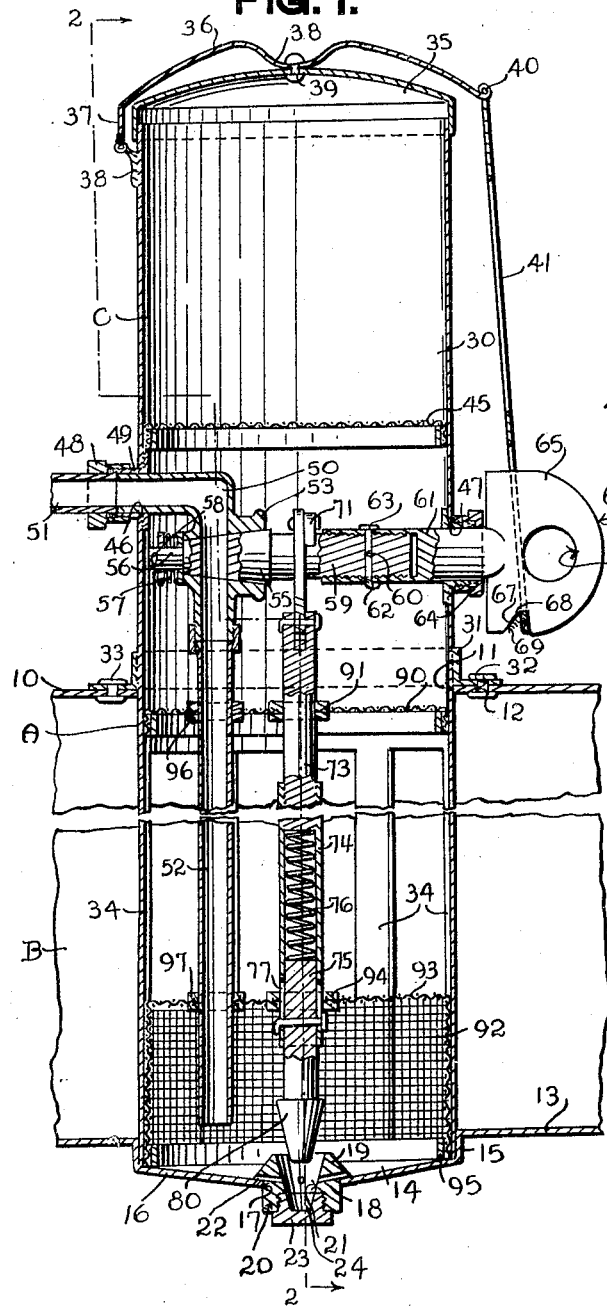
Figure 1 is a fragmentary vertical sectional view of the novel fluid container, with the fluid outlets open.

In the accompanying drawings, wherein similar reference characters designate corresponding parts thruout the several views, the letter A may generally designate the improved fluid container, the letter B the tank portion thereof, the letter C a member containing the control features thereof and the letter D a lock therefor.

The improved fluid container A comprises a tank and is particularly adapted to be carried by motor vehicles for the purpose of containing the fuel supply. It is preferably constructed of metal parts, riveted or welded together.

Figure 2:
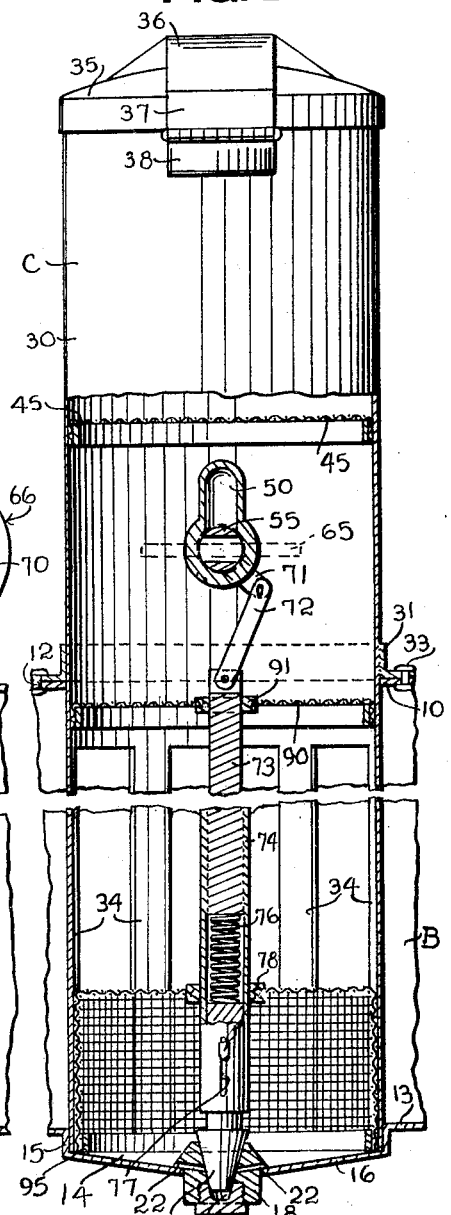
Figure 2 is a fragmentary vertical sectional view substantially on the line 2—2 of Figure 1 with the fluid outlets closed.
Figure 3:
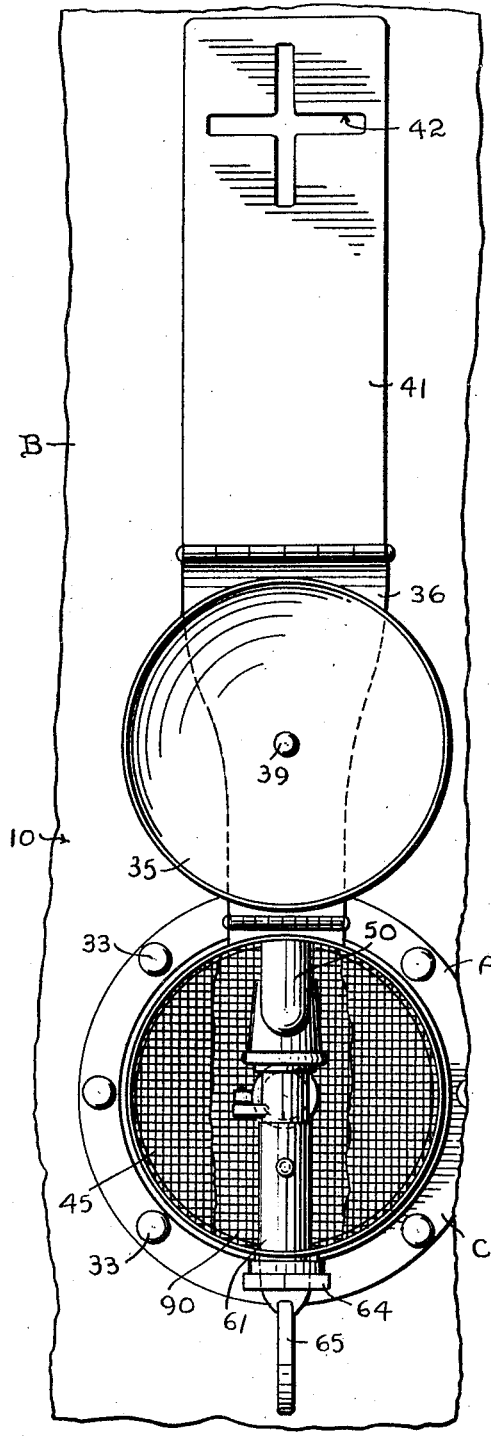
Figure 3 is a fragmentary top plan view of the novel tank with the filler inlet open.

The tank portion B may be of any approved shape and for the purpose of illustration, a tank considerably longer than higher is shown, having a top wall 10 provided with a preferably circular opening 11 therethru with the opening surrounded by a plurality of spaced apart rivet holes 12. The bottom wall 13 of the tank is provided with a sump 14 preferably circularly and of an inside diameter approximately the same as that of the opening 11, which aligns therewith as shown in Figures 1 and 2. This sump preferably has a narrow vertical wall 15 extending from the bottom wall 13 and joining a sloping portion 16 which extends downwardly and inwardly and at the center is provided with an opening 17. Into the opening is fixed, as by welding or otherwise, a valve seat 18 which projects into as well as out of the tank portion. The inner end portion 19 of the valve seat 18 is frusto-conical and the outer end 20 is preferably cylindrical, the inner end having the greater circumference in contact with the tank proper. The valve seat 18 has, of course, a conventional sloping bore 21 and the inner end 18 is provided with a plurality of ducts 22 extending from the outer surface thereof inwardly to the bore 21. These ducts are placed very close to the inner surface of the bottom wall as shown in Figures 1 and 2, so that all the fuel and sediment may be drained from the tank if necessary. The outer end 20 of the valve seat 18 is preferably interiorly screw threaded and receives a screw threaded plug 23 which has an interior depression 24 forming a continuation of the valve seat 18 and bore 21, as illustrated in Figures 1 and 2. However, it should be noted in Figure 2 that even if this plug should be removed the valve will seat snugly and when the plug is in place there is a space left to compensate for wear on the valve and to provide a temporary pocket for sediment. This plug may be provided with a tool engageable head such as is well known in the art.

Now as for the member containing the fuel control parts B, this preferably includes a tube 30 with its upper, filler or fuel inlet end projecting from the tank portion and snugly accommodated in the aperture 11, a flanged ring 31 being soldered or otherwise secured to the exterior of the tube 30 while apertures 32 in the flange axially align with the apertures 12 and accommodate rivets 33 or the like to secure B and C together. The tube 30 projects into the tank, but adjacent the top wall 10, the tube ends and terminates in spaced apart legs 34 which follow the curve of the tube. These legs extend into the sump 14 and abut the walls 15. A flanged cap or closure 35 covers the upper or outer end of the tube 30 and is preferably indirectly hinged to the tube by means of a leaf spring 36 which has one downturned end 37 which is hinged to a projection 38 welded or otherwise secured to the exterior of the tube adjacent the filler end. From this downturned end 37 the spring curves upwardly and then downwardly into a central portion 38 where it is riveted as at 39 or similarly secured to the axial center of the outer side of the cap 35. The spring again curves upwardly and downwardly and is attached by a hinged portion 40 to a hasp or elongated leaf 41 which is provided adjacent its free end with a cross-shaped slot 42 with its axis on the longitudinal medial line of the hasp.

Spaced from the mouth of the filler end of the tube 30, a distance sufficient to permit the insertion into the mouth, of a gasoline pump nozzle or a funnel end, is a filter screen 45 preferably of heavy wire mesh. Below this screen 45, the wall of the tube is pierced by a circular aperture 46 and preferably diametrically opposite but slightly lower down a second circular aperture 47. Into the first aperture 46, suitably secured by a leak-proof packing nut 48 and collar 49, extends an L-shaped fuel feed tube 50 which projects outside the tube and is suitably joined to a tube 51 which may lead to the vacuum tank (not shown) or other parts of the motor vehicle engine. The opposite end of the tube 50 extends downwardly and may be joined by an auxiliary tube 52 which ends adjacent the bottom of the tank, as shown in Figure 1, where it is open. This L-shaped tube 50 forms the fuel feed outlet. Preferably adjacent the turn in the L-shaped tube 50 and of course inside the tube 30, is interposed a valve structure 53 for shutting off or permitting the flow of fuel. This valve structure is of more or less conventional construction altho it is preferred to form the seat 54 thereof as a casting integral with the tube 50. The bore in the valve 55 is preferably the same in diameter as the bore of the tubes 50 and 52 and the exterior surface of the valve slopes to fit the seat ending in a stub 56 surrounded by a coil spring 57 one end of which abuts the valve structure and the other end is suitably secured to the stub 56 as by a pin 58 or the like. Not only does this spring tend to seat the valve as the valve and seat wear, but it has another function as will be later brought out. The end of the valve 55 opposite the end carrying the stub 56 constitutes a valve stem or shaft 59 which may have a transverse aperture 60 and be exteriorly screw threaded adjacent its free end. Threaded upon the shaft is a second shaft or valve stem 61 which is apertured as at 62 to permit the insertion of a pin 63 or similar device to extend thru the aperture 60 and thus firmly couple the two shafts together. The shaft 61 extends thru the aperture 47 of the tube 30 where it is suitably packed as at 64 and terminates in a finger grip or handle 65 which is relatively thin, of a width to be accommodated in either portion of the cross-shaped slot 42, and a length approximately the length of either portion of said slot. This is so that the handle 65 may be slipped into the slot whether the handle is vertical or horizontal and will fit snugly in the slot. The handle preferably has a rounded or curved outer end as shown at 66 and in one edge of the handle is a slot or nick 67 which is so located that it will open downwardly when the valve 55 is open. It is preferred that the round outer end 66 of the grip continue to this slot as shown in Figure 1 so that the wall 68 of the slot adjacent the outer end be abrupt and the opposite wall 69 of the slot may be curved away from the wall 68. However, it should be noted that the diameter of the auxiliary shaft 51 is considerably greater than the width of the slot 42, so that the hasp 41 cannot be forced towards the tube 30 and off of the handle 65. The spring 57 of the valve structure also prevents the shaft to be drawn outwardly so that the hasp will not ride off the handle towards the tube 30. The handle 65 is also provided with a preferably circular aperture 70 intermediate the front and rear ends thereof as shown in Figure 1.

Between the valve 55 and the inner end of the auxiliary shaft 61, the shaft 59 is provided with a radially projecting stub 71 upon which a link 72 is pivoted and which is in turn pivoted to an end of the rod 73. The other end of the rod 73 is welded or otherwise suitably secured to the interior of a tubular member 74 in which a plunger 75 slides, with a coil spring 76 between the end of the rod 73 and the inner end of the plunger. The movements of the plunger are limited by a longitudinal guide slot 77 in the wall of the tubular member thru which passes a pin 78 or the like, which pin is firmly secured to the plunger to extend radially therefrom. The outer or lower end of the plunger 75 terminates in a valve 80, adapted to seat in the valve seat 19 of the tank. These portions 71 to 80 may be said to constitute a plunger structure.

It will be noted from Figure 1 that when the valve 80 is unseated and the valve structure 53 open, the stub is at an angle of about 45° and from Figure 2, that a quarter turn of the shaft or handle will close both valves. When closed, the coil spring 76 will be compressed and the pin 78 will be very close to the upper end of the slot 77. Thus, even if the plug 23 is removed, the valve 80 cannot be unseated except by a partial turn of the handle 65. As an additional safeguard, a second filter screen 90 of preferably heavy wire mesh may be inserted into the tube 30 above the legs 34 and provided with a guide ring 91 for the plunger structure. At the lower ends of the legs 34, is placed a third filter 92 of fine wire mesh, having a wire mesh screen 93 at its upper end, which screen 93 is provided with a guide ring 94 for the plunger structure. This filter 92 has a ring reinforcement 95 at its lower end. Both filter screens 90 and 92 are also provided with reinforcements 96 and 97 encircling the auxiliary tube 52 as shown in Figure 1. The structure C is preferably of metal, not easily attacked by gasoline and the like.

The lock D may comprise a conventional padlock 100 with its shackle 101 insertable into the aperture 70 of the handle 65.

Figure 4:
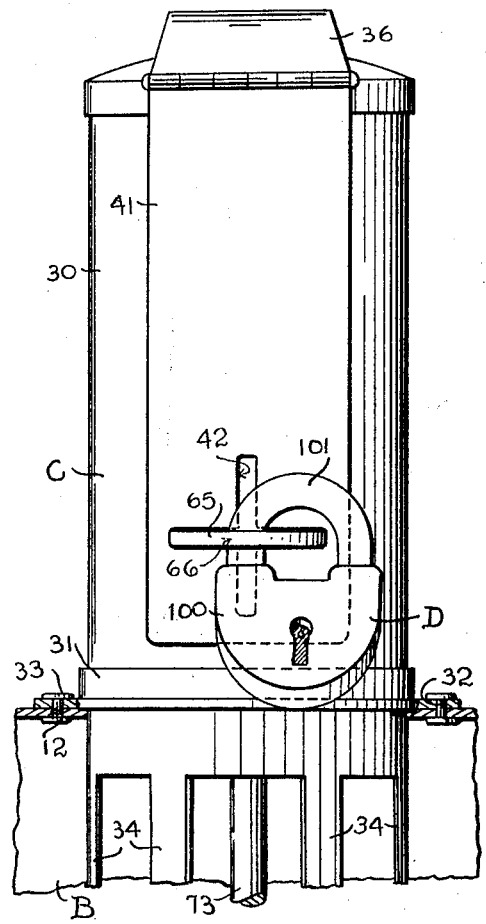
Figure 4 is a fragmentary sectional view of the novel container, with the filler inlet locked, the interior parts being substantially in the position shown in Figure 2.
Figure 5:
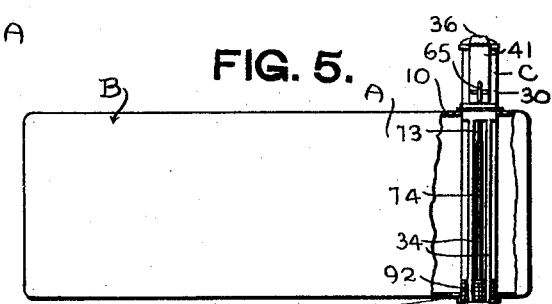
Figure 5 is a front elevation of the improved fluid container, a part being broken away to better illustrate portions of the construction and the relationship of parts.

In use, when it is desired to employ the filler opening, the cap 35 is thrown back on the hinge and the nozzle of the gas pump or a funnel inserted into the mouth of the tube 30, as in ordinary gasoline filler inlets. When the funnel or nozzle is withdrawn, the cap 35 is swung over the mouth and the hasp 41 drawn down, (due to the leaf spring 36) until the handle 65 will slip into the vertical portion of the cross-shaped slot 42 and the end of the hasp will snap into the slot 67 of the handle. This will both prevent the cap from swinging off the mouth of the tube 30 and will also prevent the shafts 59 and 61 from rotating and in turn prevent the valves from closing. The padlock 100 may or may not be used as desired. However, if the hasp is now sprung out of the slot (the leaf spring functioning toward that end) and the handle given a quarter turn, both valves will close simultaneously and the hasp may again be positioned about the handle with the handle in the horizontal portion in the cross-shaped slot as shown in Figure 4. Now, if the padlock 100 is locked in place, not only will unauthorized persons be prevented from getting at the gasoline thru the filler inlet but also from the drainage outlet and since the valve 55 is closed, the fuel feed outlet will not function and in the event an auto thief attempts to make off with the vehicle, he can drive it only as far as the gasoline between the valve structure 53 and the engine will carry him. Similarly, a quarter turn back to the first position mentioned will simultaneously open both valves. In this last position, the tank may be drained if needed, the sump and the drainage tubes permitting a very complete drainage of the tank.

The pin 63 when withdrawn permits the two shafts to be unscrewed and the entire inner structure of the fuel control portion to be withdrawn for inspection, repair, cleaning and the like.

Various changes may be made to the form of invention herein shown and described, without departing from the spirit of the invention or the scope of the following claims.

What is claimed is:

1. In a fluid container, a tank provided with a fluid inlet and a fluid outlet, a removable cover for said inlet provided with a hasp, and means carried by said tank to selectively open or close said outlet, including a movable handle engaged by said hasp when required, holding said handle against movement.

2. In a fluid container, a tank provided with a fluid inlet and a pair of outlets, a removable cover for said inlet provided with a hasp, and means carried by said tank to simultaneously close or open said outlets, including a movable handle engaged by said hasp when required, holding said handle against movement.

3. In a fluid container, a tank provided with a fluid inlet and a fluid outlet, a hinged cover for said inlet having a hasp, and means carried by said tank to selectively open or close said outlet, including a rotatable handle engaged by said hasp when required to lock said handle against rotation.

4. In a fluid container, a tank provided with a fluid inlet and a fluid outlet, a removable cover for said inlet provided with a hasp, and means carried by said tank to selectively open or close said outlet, including a rotatable handle provided with a slot accommodating a portion of said hasp when required, holding said handle against rotation.

5. In a fluid container, a tank provided with a fluid inlet and a fluid outlet, a removable cover for said inlet provided with a hasp, means carried by said tank to selectively open or close said outlet, including a movable handle provided with an opening adjacent the outer end thereof, said handle passing thru the slot in said hasp and projecting therefrom with said opening exposed, and a lock in said opening.

6. In a fluid container, a tank provided with a fluid inlet and a fluid outlet, a removable cover for said inlet having a hasp, said hasp provided with a cross-shaped slot, means carried by said tank to selectively open and close said outlet, including a shank in said tank extending therefrom with the extending end provided with a substantially thin finger grip having an aperture adjacent the free end thereof, and a slot between said aperture and said tank, said finger grip accommodated snugly in said slot in said hasp and projecting therefrom, the free end of said hasp carried in said slot in said finger grip, and a lock carried in said aperture.

7. In a fluid container, a tank provided with a fluid inlet and a fluid outlet, a removable cover for said inlet having a hasp, said hasp provided with a cross-shaped narrow slot, means carried by said tank to selectively open or close said outlet, including a shaft in said tank having a diameter greater than the width of said narrow slot, said shaft extending from said tank with the extending end provided with a substantially thin finger grip having an aperture adjacent the free end thereof and a slot between said opening and said tank, said finger grip accommodated snugly in said slot in said hasp and projecting therefrom with the free end of said hasp carried in said slot in the finger grip, and a lock carried in said aperture.

8. In a fluid container, a tank provided with a fluid inlet and a fluid outlet, a removable cover for said inlet provided with a hasp, spring means attaching said cover to said hasp, and means carried by said tank to selectively open or close said outlet, including a rotatable handle provided with a slot accommodating a portion of said hasp against the tension of said spring means, holding said handle against rotation and said cover closed.

9. In a fluid container, a tank provided with a fluid inlet and a fluid outlet, a cover for said inlet including a leaf spring hinged at one end of said tank and attached to said cover at its intermediate portion with the opposite end carrying a hasp hinged thereto, and means carried by said tank to selectively open or close said outlet, including a rotatable handle provided with a slot accommodating a portion of said hasp against the tension of said spring, holding said handle against rotation and said cover closed.

10. In a fluid container, a tank having a feed outlet and a drainage outlet; a hollow member carried by said tank, a shaft extending into and carried by said member; a rotatable valve in said member at an end of said shaft controlling one of said outlets; and a plunger operatively connected to said shaft controlling the other of said outlets as said shaft is rotated.

11. In a fluid container, a tank having a feed outlet and a drainage outlet; a hollow member carried by said tank; a shaft extending into and carried by said member; a rotatable valve in said member at an end of said shaft for opening or closing one of said outlets; and a plunger operatively connected to said shaft, controlling the other of said outlets in synchronism with the opening and closing of the rotatable valve controlled outlet, as the shaft is rotated.

12. In a fluid container, a tank having an opening therein, a feed outlet and a drainage outlet; a hollow member snugly carried in said opening, extending into said tank and projecting outwardly therefrom, said member open at its end; a shaft extending into said member and projecting exteriorly thereof, with the outwardly projecting end thereof provided with a handle; a rotatable valve at the inwardly projecting end of said shaft, controlling one of said outlets; a plunger operatively connected to said shaft, controlling the opening or closing of the aperture of said outlet upon rotation of said shaft in synchronism with the opening or closing of the rotatable valve controlled outlet; and a removable closure for the outwardly projecting end of said member provided with a hasp-like depending portion, said portion engageable about said handle, locking said cover to said end and said shaft against rotation.

13. In a fluid container, a tank having an opening therein, a feed outlet, a drainage outlet and a sump about the drainage outlet, a hollow member carried in said opening extending into said tank with the extending end of said member provided with spaced apart legs projecting into said sump and in abutment with the walls thereof, a filter about said legs and extending into said sump, a shaft extending into and carried by said member, a rotatable valve in said member at an end of said shaft controlling one of said outlets, and a plunger operatively connected to said shaft controlling the other of said outlet as said shaft is rotated.

ZESTON STARKS.